(12) United States Patent
Fattal (10) Patent No.: US 10,703,375 B2
(45) Date of Patent: Jul. 7, 2020

(54) VEHICLE MONITORING SYSTEM

(71) Applicant: LEIA INC., Menlo Park, CA (US)

(72) Inventor: David A. Fattal, Mountain View, CA (US)

(73) Assignee: LEIA INC., Menlo Park, CA (US)

(*) Notice: Subject to any disclaimer, the term of this patent is extended or adjusted under 35 U.S.C. 154(b) by 32 days.

(21) Appl. No.: 15/814,273

(22) Filed: Nov. 15, 2017

(65) Prior Publication Data

US 2018/0072320 A1    Mar. 15, 2018

Related U.S. Application Data

(63) Continuation of application No. PCT/US2015/033432, filed on May 30, 2015.

(51) Int. Cl.
*B60W 40/02* (2006.01)
*G08G 1/0962* (2006.01)
(Continued)

(52) U.S. Cl.
CPC ............. *B60W 40/02* (2013.01); *B60K 35/00* (2013.01); *B60Q 9/008* (2013.01); *B60R 1/00* (2013.01);
(Continued)

(58) Field of Classification Search
CPC ................. B60W 40/02; B60W 50/14; B60W 2050/146; G01S 17/08; G01S 17/936; H04N 13/207; H04N 13/302; G06T 19/20; G06T 2219/2012; G06T 7/521; B60Q 9/008; G08G 1/167; G08G 1/165; G08G 1/0962; G08G 1/166; G06K 9/00805;
(Continued)

(56) References Cited

U.S. PATENT DOCUMENTS 5,615,024 A   3/1997   May et al.
5,617,248 A   4/1997   Takahashi et al.
(Continued)

FOREIGN PATENT DOCUMENTS

CN   1213097 A   4/1999
CN   1619373 A   5/2005
(Continued)

OTHER PUBLICATIONS

International Search Report (ISR), 3 pages, from KIPO (ISA/KR), dated Feb. 26, 2016, for counterpart parent PCT patent application No. PCTUS2015033432.
(Continued)

*Primary Examiner* — Joseph W Becker
(74) *Attorney, Agent, or Firm* — J. Michael Johnson (57) ABSTRACT

Vehicle monitoring employs three-dimensional (3D) information in a region adjacent to a vehicle to visually highlight objects that are closer to the vehicle than a threshold distance. A vehicle monitoring system includes a 3D scanner to scan the region adjacent to the vehicle and provide a 3D model including a spatial configuration of objects located within the scanned region. The vehicle monitoring system further includes an electronic display to display a portion of the scanned region using the 3D model and to visually highlight an object within the displayed portion that is located less than the threshold distance from the vehicle.

16 Claims, 6 Drawing Sheets

(51) Int. Cl.

| | | |
|---|---|---|
| *G08G 1/16* | (2006.01) | |
| *B60Q 9/00* | (2006.01) | |
| *G06K 9/00* | (2006.01) | |
| *G06T 19/20* | (2011.01) | |
| *G01S 17/931* | (2020.01) | |
| *G06T 7/521* | (2017.01) | |
| *H04N 13/207* | (2018.01) | |
| *H04N 13/302* | (2018.01) | |
| *B60K 35/00* | (2006.01) | |
| *B60R 1/00* | (2006.01) | |
| *B60W 50/14* | (2020.01) | |
| *G01S 17/08* | (2006.01) | |
| *F21V 8/00* | (2006.01) | |
| *G02B 27/30* | (2006.01) | |

(52) U.S. Cl.
CPC ............ *B60W 50/14* (2013.01); *G01S 17/08* (2013.01); *G01S 17/931* (2020.01); *G06K 9/00201* (2013.01); *G06K 9/00791* (2013.01); *G06K 9/00805* (2013.01); *G06T 7/521* (2017.01); *G06T 19/20* (2013.01); *G08G 1/0962* (2013.01); *G08G 1/165* (2013.01); *G08G 1/166* (2013.01); *G08G 1/167* (2013.01); *H04N 13/207* (2018.05); *H04N 13/302* (2018.05); *B60K 2370/1531* (2019.05); *B60R 2300/105* (2013.01); *B60W 2050/146* (2013.01); *G02B 6/0038* (2013.01); *G02B 27/30* (2013.01); *G06K 2209/40* (2013.01); *G06T 2219/2012* (2013.01)

(58) Field of Classification Search
CPC ........... G06K 2209/40; G06K 9/00791; G06K 9/00201; B60K 2350/2017; B60K 35/00; G02B 27/30; G02B 6/0038; B60R 2300/105; B60R 1/00
See application file for complete search history.

(56) References Cited

U.S. PATENT DOCUMENTS

| | | |
|---|---|---|
| 5,721,598 A | 2/1998 | Smith |
| 5,729,311 A | 3/1998 | Broer et al. |
| 5,926,294 A | 7/1999 | Sato et al. |
| 6,580,529 B1 | 6/2003 | Amitai et al. |
| 6,667,819 B2 | 12/2003 | Nishikawa et al. |
| 6,980,271 B2 | 12/2005 | Fujishiro |
| 7,114,820 B1 | 10/2006 | Parikka et al. |
| 7,742,120 B2 | 6/2010 | Bayley et al. |
| 7,773,849 B2 | 8/2010 | Shani |
| 7,903,332 B2 | 3/2011 | De Zwart et al. |
| 8,026,997 B2 | 9/2011 | Feng |
| 8,150,142 B2 | 4/2012 | Freedman et al. |
| 8,251,563 B2 | 8/2012 | Papakonstanitinou et al. |
| 8,400,494 B2 | 3/2013 | Zalevsky et al. |
| 8,456,517 B2 | 6/2013 | Spektor et al. |
| 8,494,252 B2 | 7/2013 | Freedman et al. |
| 8,619,363 B1 | 12/2013 | Coleman |
| 8,681,423 B1 | 3/2014 | Gibson et al. |
| 8,754,760 B2 | 6/2014 | Augst |
| 8,872,919 B2 | 10/2014 | Watanabe et al. |
| 9,128,226 B2 | 9/2015 | Fattal et al. |
| 9,201,270 B2 | 12/2015 | Fattal et al. |
| 9,298,168 B2 | 3/2016 | Taff et al. |
| 9,389,415 B2 | 7/2016 | Fattal et al. |
| 9,459,461 B2 | 10/2016 | Santori et al. |
| 9,557,466 B2 | 1/2017 | Fattal |
| 2002/0008834 A1 | 1/2002 | Suzuki |
| 2002/0075445 A1 | 6/2002 | Dabrowski et al. |
| 2003/0086649 A1 | 5/2003 | Zhou |
| 2004/0130879 A1 | 7/2004 | Choi et al. |
| 2004/0156182 A1 | 8/2004 | Hatjasalo et al. |
| 2004/0156589 A1 | 8/2004 | Gunn et al. |
| 2005/0007757 A1 | 1/2005 | Leu et al. |
| 2005/0041174 A1 | 2/2005 | Numata et al. |
| 2005/0073627 A1 | 4/2005 | Akiyama |
| 2005/0123229 A1 | 6/2005 | Huck et al. |
| 2005/0140832 A1 | 6/2005 | Goldman et al. |
| 2005/0201122 A1 | 9/2005 | Shinohara et al. |
| 2005/0264717 A1 | 12/2005 | Chien et al. |
| 2006/0083476 A1 | 4/2006 | Winkler |
| 2006/0104570 A1 | 5/2006 | Rausch |
| 2006/0192660 A1 | 8/2006 | Watanabe et al. |
| 2007/0058394 A1 | 3/2007 | Yu |
| 2007/0129864 A1 | 6/2007 | Tanaka et al. |
| 2007/0213955 A1 | 9/2007 | Ishida et al. |
| 2007/0279367 A1 | 12/2007 | Kitai |
| 2007/0298533 A1 | 12/2007 | Yang et al. |
| 2008/0161997 A1 | 7/2008 | Wengelnik et al. |
| 2008/0204663 A1 | 8/2008 | Balogh |
| 2008/0204873 A1 | 8/2008 | Daniell |
| 2008/0225393 A1 | 9/2008 | Rinko |
| 2008/0285307 A1 | 11/2008 | Aylward et al. |
| 2008/0297696 A1 | 12/2008 | Banerjee |
| 2008/0304535 A1 | 12/2008 | Parriaux et al. |
| 2009/0091667 A1 | 4/2009 | Schultz et al. |
| 2009/0091837 A1 | 4/2009 | Chao et al. |
| 2009/0129116 A1 | 5/2009 | Kim et al. |
| 2009/0207342 A1 | 8/2009 | Yamaguchi et al. |
| 2009/0213300 A1 | 8/2009 | Daiku |
| 2009/0244706 A1 | 10/2009 | Levola et al. |
| 2009/0290837 A1 | 11/2009 | Chen et al. |
| 2009/0322986 A1 | 12/2009 | Wei et al. |
| 2010/0039832 A1 | 2/2010 | Ahlgren et al. |
| 2010/0103485 A1 | 4/2010 | Haussler |
| 2010/0117812 A1 | 5/2010 | Laubinger et al. |
| 2010/0118117 A1 | 5/2010 | Kroll et al. |
| 2010/0123952 A1 | 5/2010 | Chen et al. |
| 2010/0207964 A1 | 8/2010 | Kimmel et al. |
| 2010/0284085 A1 | 11/2010 | Laakkonen |
| 2010/0289870 A1 | 11/2010 | Leister |
| 2010/0302803 A1 | 12/2010 | Bita et al. |
| 2010/0321781 A1 | 12/2010 | Levola et al. |
| 2011/0002143 A1 | 1/2011 | Saarikko et al. |
| 2011/0141395 A1 | 6/2011 | Yashiro |
| 2011/0149596 A1 | 6/2011 | Lv et al. |
| 2011/0157257 A1 | 6/2011 | Bennett et al. |
| 2011/0157667 A1 | 6/2011 | Lacoste et al. |
| 2011/0182570 A1 | 7/2011 | Yeh |
| 2011/0199197 A1 | 8/2011 | Takatsudo et al. |
| 2011/0241573 A1 | 10/2011 | Tsai et al. |
| 2011/0242102 A1 | 10/2011 | Hess |
| 2011/0242837 A1 | 10/2011 | Cornelissen et al. |
| 2011/0254916 A1 | 10/2011 | Fan et al. |
| 2011/0304784 A1 | 12/2011 | Hirota et al. |
| 2012/0008067 A1 | 1/2012 | Mun et al. |
| 2012/0013962 A1 | 1/2012 | Subbaraman et al. |
| 2012/0075698 A1 | 3/2012 | Minami |
| 2012/0075878 A1 | 3/2012 | Sato et al. |
| 2012/0113678 A1 | 5/2012 | Cornelissen et al. |
| 2012/0120213 A1 | 5/2012 | Ohyama et al. |
| 2012/0127547 A1 | 5/2012 | Gocho et al. |
| 2012/0127573 A1 | 5/2012 | Robinson et al. |
| 2012/0127751 A1 | 5/2012 | Kimmel |
| 2012/0162427 A1 | 6/2012 | Lynam |
| 2012/0176665 A1 | 7/2012 | Song et al. |
| 2012/0249934 A1 | 10/2012 | Li et al. |
| 2012/0250141 A1 | 10/2012 | Chen |
| 2013/0021453 A1 | 1/2013 | Gignac et al. |
| 2013/0057539 A1 | 3/2013 | Kim |
| 2013/0082980 A1 | 4/2013 | Gruhlke et al. |
| 2013/0201723 A1 | 8/2013 | Gourlay |
| 2014/0354684 A1* | 12/2014 | Beckwith ................. G06F 3/011 345/633 |
| 2015/0036068 A1 | 2/2015 | Fattal |
| 2015/0054636 A1 | 2/2015 | Sangorrin et al. |
| 2015/0116481 A1 | 4/2015 | Troy et al. |
| 2015/0355403 A1 | 12/2015 | Santori et al. |

(56) References Cited

U.S. PATENT DOCUMENTS

2016/0018582 A1    1/2016    Fiorentino et al.
2017/0090096 A1    3/2017    Fattal

FOREIGN PATENT DOCUMENTS

| | | |
|---|---|---|
| CN | 101750664 A | 6/2010 |
| CN | 202126538 | 1/2012 |
| JP | H08190095 A | 7/1996 |
| JP | H0943594 A | 2/1997 |
| JP | H10117340 A | 5/1998 |
| JP | 2000267041 A | 9/2000 |
| JP | 2002031788 A | 1/2002 |
| JP | 2004077897 A | 3/2004 |
| JP | 2004302186 A | 10/2004 |
| JP | 2005075190 A | 3/2005 |
| JP | 2006252389 A | 9/2006 |
| JP | 2008083532 A | 4/2008 |
| JP | 2008164963 A | 7/2008 |
| JP | 2009053499 A | 3/2009 |
| JP | 2009288718 A | 12/2009 |
| JP | 2009295598 A | 12/2009 |
| JP | 2010102188 A | 5/2010 |
| JP | 2010237416 A | 10/2010 |
| JP | 2011029161 A | 2/2011 |
| JP | 2011070593 A | 4/2011 |
| JP | 2011133677 A | 7/2011 |
| JP | 2011232717 A | 11/2011 |
| JP | 2012022085 A | 2/2012 |
| JP | 2013026770 A | 2/2013 |
| JP | 2014229102 A | 12/2014 |
| WO | 9908257 A1 | 2/1999 |
| WO | 2012069071 A1 | 5/2012 |

OTHER PUBLICATIONS

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Fattal, David et al., "A multi-directional backlight for a wide-angle, glasses-free three-dimensional display," Nature, Mar. 21, 2013, pp. 348-351, vol. 495, Macmillan Publishers Limited, 2013.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Henry, Peter et al., "RGB-D Mapping: Using Depth Cameras for Dense 3D Modeling of Indoor Environments," In the 12th International Symposium on Experimental Robotics (ISER), 2010, 15 pages, 146-12.

Se, Stephen et al., "Stereo-Vision Based 3D Modeling and Localization for Unmanned Vehicles," International Journal of Intelligent Control and Systems, Mar. 2008, pp. 46-57, vol. 13, No. 1.

Nora Broy, et al., 3D Displays in Cars: Exploring the User Performance for a Stereoscopic Instrument Cluster, Proceedings of the 6th International Conference on Automotive User Interfaces and Interactive Vehicular Applications—AutomotiveUI '14, Jan. 1, 2014, 9 pages, New York, USA.

\* cited by examiner

VEHICLE MONITORING SYSTEM

CROSS-REFERENCE TO RELATED APPLICATIONS

This application is a continuation application of and claims the benefit of priority to prior International Application No. PCT/US2015/033432, filed May 30, 2015, the entire contents of which is incorporated herein by reference.

STATEMENT REGARDING FEDERALLY SPONSORED RESEARCH OR DEVELOPMENT

N/A

BACKGROUND

Vehicle monitoring systems are becoming more and more common as a means for providing situational awareness and collision avoidance. Such vehicle monitoring systems often include an electronic display to communicate information to a user (e.g., a driver of the vehicle). In particular, the electronic display may provide a view of a region adjacent to the vehicle to make the user aware of and to facilitate the user avoiding objects in the adjacent region.

A wide variety of electronic displays may be used in a vehicle monitoring system including, but not limited to, displays based on cathode ray tubes (CRT), plasma display panels (PDP), liquid crystal displays (LCD), electroluminescent (EL) displays, organic light emitting diodes (OLED) and active matrix OLEDs (AMOLED) displays, electrophoretic (EP) displays and various other displays that employ electromechanical or electrofluidic light modulation (e.g., digital micromirror devices, electrowetting displays, etc.). In general, electronic displays may be categorized as either active displays (i.e., displays that emit light) or passive displays (i.e., displays that modulate light provided by another source). Among the most evident examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as an active display. Examples of such coupled light sources are backlights. Backlights are light sources (often panel light sources) that are placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Embodiments in accordance with the principles described herein provide a vehicle monitoring system that employs three-dimensional (3D) information. In particular, in accordance with some embodiments of the principles described herein, 3D information comprising 3D scans or images is collected for a monitored region adjacent to a vehicle. The monitored region may be one or more of in front of, beside and behind the vehicle, for example. The 3D information from the monitored region is then used to construct a 3D model including a spatial configuration of objects within the monitored region. Further, a portion of the monitored region based on the 3D model is displayed and objects within the display portion that are less than a predetermined threshold distance from the vehicle are visually highlighted objects. According to various embodiments, perception of the visually highlighted objects by a user may be enhanced. Moreover, the enhanced perception of the visually highlighted objects may facilitate collision avoidance with respect to those visually highlighted objects that are too close to the vehicle, for example.

According to various embodiments, a 3D scanner or 3D camera is combined with an electronic display as a vehicle monitoring system to monitor the region adjacent to the vehicle. The 3D scanner collects the 3D information regarding objects in the monitored region to facilitate construction of the 3D model. The electronic display provides an image of the monitored region based on the 3D model. Further, visual highlighting of objects that are considered to be too close to the vehicle (i.e., objects that are less than the predetermined threshold distance from the vehicle) is provided by the electronic display.

According to some embodiments described herein, visual highlighting of the objects is provided by a 3D electronic display (one or both of monochromatic and color). Further, in various embodiments, the 3D electronic display may be configured to present images and related information in a so-called 'glasses-free' 3D or autostereoscopic 3D manner. In particular, in some embodiments, the 3D electronic display may employ a diffraction grating based or 'grating-based' backlight to produce different views of the 3D images or information. In a 3D electronic display that employs a grating-based backlight, light is coupled out of light guide using a plurality of diffraction gratings. The coupled-out light forms a plurality of light beams that is directed in a predefined direction (e.g., a viewing direction). Further, light beams of the light beam plurality may have different principal angular directions from one another to form or provide a light field in the electronic display viewing direction and may also represent a plurality of primary colors, in some embodiments. The light beams having the different principal angular directions (also referred to as 'the differently directed light beams') and, in some embodiments, representing different colors, may be employed to autosteroscopically display information including three-dimensional (3D) information. For example, the differently directed, different color light beams may be modulated and serve as color pixels of or represent different view of the 'glasses free' 3D color electronic display.

Herein, a 'light guide' is defined as a structure that guides light within the structure using total internal reflection. In particular, the light guide may include a core that is substantially transparent at an operational wavelength of the light guide. In various embodiments, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, a plate light guide may be substantially flat (i.e., confined to a plane) and so the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to insure that total internal reflection is maintained within the plate light guide to guide light.

According to various embodiments described herein, a diffraction grating (e.g., a multibeam diffraction grating) may be employed to scatter or couple light out of a light guide (e.g., a plate light guide) as a light beam. Herein, a 'diffraction grating' is generally defined as a plurality of features (i.e., diffractive features) arranged to provide diffraction of light incident on the diffraction grating. In some embodiments, the plurality of features may be arranged in a periodic or quasi-periodic manner. For example, the diffraction grating may include a plurality of features (e.g., a plurality of grooves in a material surface) arranged in a one-dimensional (1D) array. In other examples, the diffraction grating may be a two-dimensional (2D) array of features. The diffraction grating may be a 2D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating (i.e., diffracted light) generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a surface (i.e., wherein a 'surface' refers to a boundary between two materials). The surface may be a surface of a plate light guide. The diffractive features may include any of a variety of structures that diffract light including, but not limited to, one or more of grooves, ridges, holes and bumps, and these structures may be one or more of at, in and on the surface. For example, the diffraction grating may include a plurality of parallel grooves in a material surface. In another example, the diffraction grating may include a plurality of parallel ridges rising out of the material surface. The diffractive features (whether grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

By definition herein, a 'multibeam diffraction grating' is a diffraction grating that produces coupled-out light that includes a plurality of light beams. Further, the light beams of the plurality produced by a multibeam diffraction grating have different principal angular directions from one another, by definition herein. In particular, by definition, a light beam of the plurality has a predetermined principal angular direction that is different from another light beam of the light beam plurality as a result of diffractive coupling and diffractive redirection of incident light by the multibeam diffraction grating. The light beam plurality may represent a light field. For example, the light beam plurality may include eight light beams that have eight different principal angular directions. The eight light beams in combination (i.e., the light beam plurality) may represent the light field, for example. According to various embodiments, the different principal angular directions of the various light beams are determined by a combination of a grating pitch or spacing and an orientation or rotation of the diffractive features of the multibeam diffraction grating at points of origin of the respective light beams relative to a propagation direction of the light incident on the multibeam diffraction grating.

According to various embodiments described herein, the light coupled out of the light guide by the diffraction grating (e.g., a multibeam diffraction grating) represents a pixel of an electronic display. In particular, the light guide having a multibeam diffraction grating to produce the light beams of the plurality having different principal angular directions may be part of a backlight of or used in conjunction with an electronic display such as, but not limited to, a 'glasses free' three-dimensional (3D) electronic display (also referred to as a multiview or 'holographic' electronic display or an autostereoscopic display). As such, the differently directed light beams produced by coupling out guided light from the light guide using the multibeam diffractive grating may be or represent 'pixels' of the 3D electronic display.

Herein a 'collimating' mirror is defined as a mirror having a curved shape that is configured to collimate light reflected by the collimating mirror. For example, the collimating mirror may have a reflecting surface characterized by a parabolic curve or shape. In another example, the collimating mirror may comprise a shaped parabolic mirror. By 'shaped parabolic' it is meant that a curved reflecting surface of the shaped parabolic mirror deviates from a 'true' parabolic curve in a manner determined to achieve a predetermined reflection characteristic (e.g., a degree of collimation). In some embodiments, the collimating mirror may be a continuous mirror (i.e., having a substantially smooth, continuous reflecting surface), while in other embodiments the mirror may comprise a Fresnel reflector or Fresnel mirror that provides light collimation. According to various embodiments, an amount of collimation provided by the collimating mirror may vary in a predetermined degree or amount from one embodiment to another. Further, the collimating mirror may be configured to provide collimation in one or both of two orthogonal directions (e.g., a vertical direction and a horizontal direction). That is, the collimating mirror may include a parabolic or shaped parabolic shape in one or both of two orthogonal directions, according to various examples.

Herein, the term 'zero disparity plane' when used with respect to a 3D electronic display is defined as a plane or planar section of a 3D scene or region being displayed or rendered that appears identical (i.e., has no visual disparity) in all views of 3D electronic display. Further, by definition herein, the zero disparity plane appears at, corresponds to, or is coincident with a physical surface of the 3D electronic display. That is, an object in the displayed scene or region located at the zero disparity plane within the 3D region will appear to be collocated with the physical surface of the 3D electronic display when rendered by the 3D electronic display and viewed thereon. Objects that are farther away than the zero disparity plane will appear to be behind the physical surface, while objects that are closer than the zero disparity plane will appear to be in front of the physical surface.

Herein, a 'projective transformation' or equivalently a 'projective transform' is defined as a (possibly non-linear) transformation of 3D space that maps lines into lines (or light rays into light rays). Note that a projective transformation can generally be expressed in terms of a linear transformation in a four-dimensional (4D) space (i.e., a 'projective space') by the means of a 4×4 matrix. In some embodiments herein, the projective transformation may include an optical transform configured to compress depth content substantially equivalent to viewing a scene through a diverging lens (e.g., a fisheye lens). In particular, a projective transformation may map an infinite far plane into a desired distance 1/h from the zero disparity plane. The projective transformation that provide the infinite far plane to 1/h distance mapping may be given by equation (1) as $$\begin{pmatrix} x' \\ y' \\ z' \\ w' \end{pmatrix} = \begin{pmatrix} 1 & 0 & 0 & 0 \\ 0 & 1 & 0 & 0 \\ 0 & 0 & 1 & 0 \\ 0 & 0 & -h & 1 \end{pmatrix} \begin{pmatrix} x \\ y \\ z \\ w \end{pmatrix} \quad (1)$$

where (x',y',z',w') are image coordinates corresponding to the projective transformation of the coordinates (x,y,z,w). Further, by definition herein, the projective transformation of equation (1) generally does not compress depth or parallax near the zero disparity plane itself. In other embodiments, another optical transform (e.g., represented by a 4×4 matrix) may be employed as the projective transformation herein. For example, the projective transformation may be substantially any projective transformation that highlights an object or a portion thereof as described below, according to some embodiments of the principles described herein. Moreover, herein the projective transformation may comprise either a linear transformation or a non-linear transformation, according to various embodiments.

Further, as used herein, the article 'a' is intended to have its ordinary meaning in the patent arts, namely 'one or more'. For example, 'a grating' means one or more gratings and as such, 'the grating' means 'the grating(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 1:
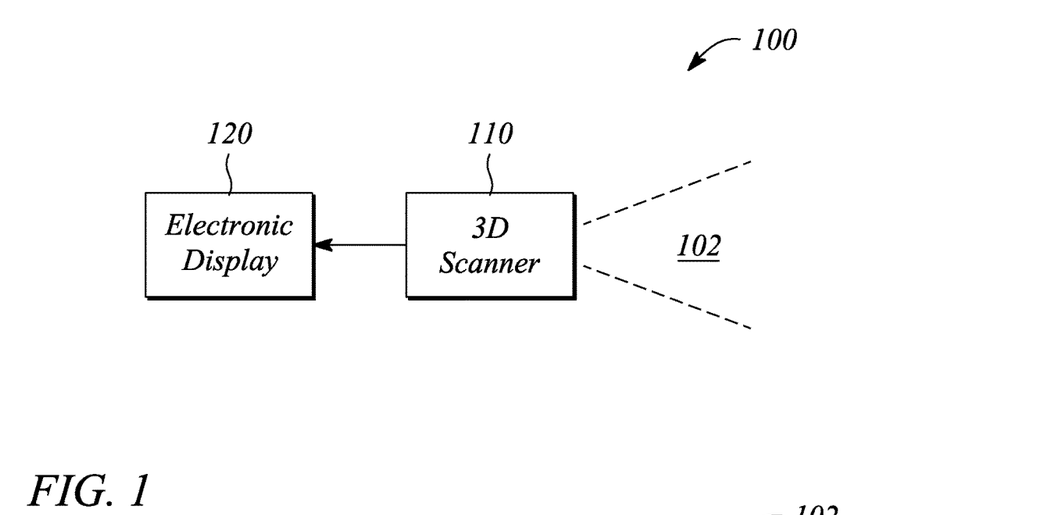
FIG. 1 illustrates a block diagram of a vehicle monitoring system in an example, according to an embodiment consistent with the principles described herein.
Figure 2A:
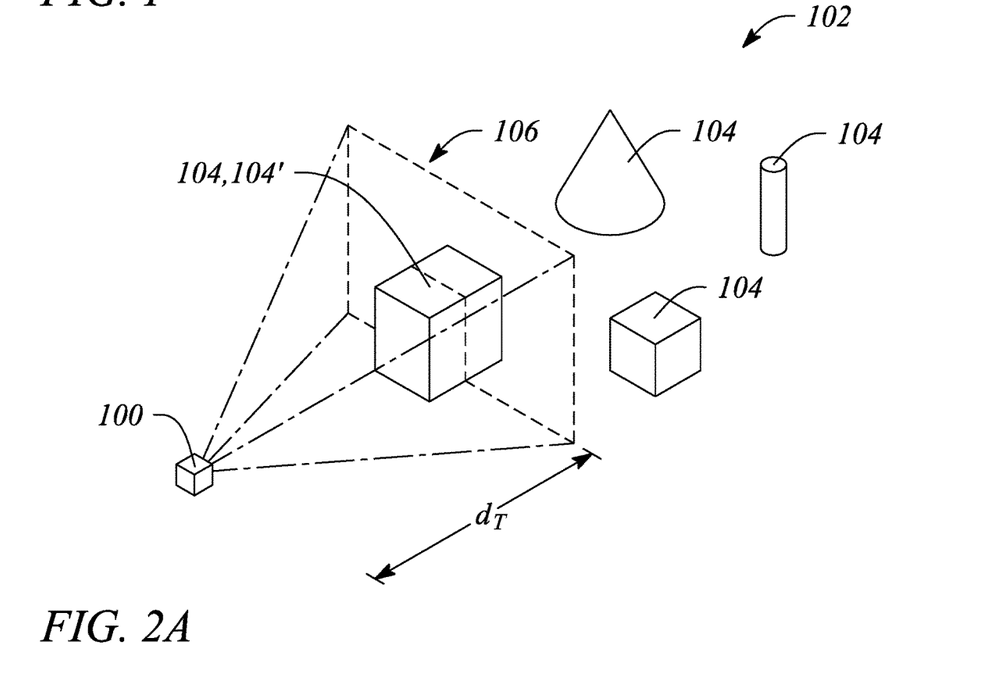
FIG. 2A illustrates a perspective view of a region monitored using the vehicle monitoring system of FIG. 1 in an example, according to an embodiment consistent with the principles described herein.
Figure 2B:
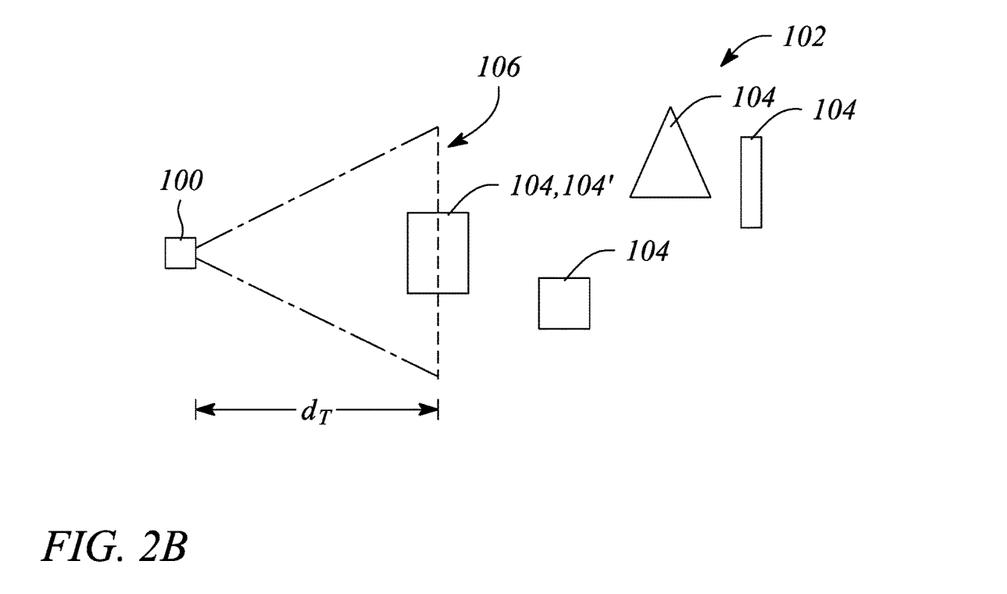
FIG. 2B illustrates a side view of the monitored region of FIG. 2B in an example, according to an embodiment consistent with the principles described herein.

In accordance with some embodiments of the principles described herein, a vehicle monitoring system is provided. FIG. 1 illustrates a block diagram of a vehicle monitoring system 100 in an example, according to an embodiment consistent with the principles described herein. FIG. 2A illustrates a perspective view of a region 102 monitored using the vehicle monitoring system 100 of FIG. 1 in an example, according to an embodiment consistent with the principles described herein. FIG. 2B illustrates a side view of the monitored region 102 of FIG. 2A in an example, according to an embodiment consistent with the principles described herein. By definition herein, the 'region' that is monitored by the vehicle monitoring system 100 is an area in a vicinity of, adjacent to or around a vehicle (hereinafter, the 'region' may be collectively referred to as 'adjacent region'). According to various embodiments, the region 102 that is monitored may include one or more of in front of the vehicle, behind the vehicle and to a side of the vehicle.

For example, the vehicle monitoring system 100 may be used to monitor a region 102 behind a vehicle and thus serve as a backup or rearview monitoring system. In particular, the vehicle monitoring system 100 may be configured as a rearview or backup assistance vehicle monitoring system to assist in collision avoidance when the vehicle is moving backwards. In another example, the region 102 that is monitored may be in front of the vehicle. As such, the vehicle monitoring system 100 may serve as a front-end collision avoidance system for when the vehicle is moving forward, for example.

As illustrated in FIG. 1, the vehicle monitoring system 100 comprises a three-dimensional (3D) scanner 110. The 3D scanner 110 is configured to scan the region 102 adjacent to the vehicle. The scan by the 3D scanner is then used to generate or provide a 3D model of the region 102. In particular, the 3D model includes a spatial configuration of objects 104 located within the region 102 that is scanned. The region 102 that is scanned adjacent to the vehicle may be also referred to herein as the 'scanned' region 102 or equivalently as an 'imaged' region 102.

In general, the 3D scanner 110 may comprise any of a variety of different 3D scanning or imaging systems capable of determining a distance to various objects 104 in the scanned region 102. According to some embodiments, the 3D scanner 110 comprises a plurality of cameras offset from one another. The distance from the 3D scanner 110 to an object 104 within the scanned region 102 may be determined, for example, by disparity estimation using separate images captured by different cameras of the camera plurality. For example, the plurality of cameras may comprise a binocular pair of cameras and the distance to the object 104 may be determined using binocular disparity estimation within the region 102 that is scanned. An image processor (not illustrated in FIGS. 1, 2A, 2B) of the vehicle monitoring system 100 may perform the disparity estimation and further may generate or otherwise provide the 3D model from the disparity estimation determined distance to the objects 104, according to some embodiments. The image processor may be part of the 3D scanner 110, for example.

In another embodiment, the 3D scanner 110 comprises a scanner-less light detection and ranging (LIDAR) system such as a time-of-flight camera in which distance is determined from a propagation time of a pulse of light reflected by an object in the region 102 that is scanned. In particular, the time-of-flight camera generates a pulse of light using a laser or another similar light source. The light pulse is then used to illuminate the scanned region 102. Any object 104 within the scanned region 102 reflects the illuminating light pulse back to the time-of-flight camera. Distance to the object 104 is determined from a length of time or 'time-of-flight' that it takes for the illuminating light pulse to propagate to the object, reflect off of the object and then return to an optical sensor (e.g., a focal plane array) of the time-of-flight camera. Time-of-flight distance may be determined on a pixel-by-pixel basis using the time-of-flight camera to provide the 3D model of the scanned region 102, for example.

In another embodiment, the 3D scanner 110 comprises a distance sensor configured to measure a distance to a plurality of points within the region 102 that is scanned. The plurality of points may include the object 104, for example. In some embodiments that include a distance sensor, the 3D scanner 110 may further comprise a camera configured to capture a corresponding two-dimensional (2D) image of the scanned region 102. The measured distance provided by the distance sensor may be used to generate one or both of a point cloud and an object mesh of the scanned region 102. In turn, the point cloud or the object mesh may be either used directly as the 3D model or employed to generator the 3D model (e.g., in an image processor of the vehicle monitoring system 100). The 2D image captured by the camera may be used to paint the 3D model. By 'paint' it is meant that the 2D image is overlaid onto or combined with the 3D model (e.g., for example when the 3D model is rendered on a display). A variety of distance sensors may be employed in this embodiment of the 3D scanner 110 including, but not limited to, an acoustic distance sensor and an optical (e.g., scanning laser-based) distance sensor, for example.

In particular, the distance sensor of the 3D scanner 110 may comprise a laser configured to scan the region 102. Further, the distance sensor may comprise an optical sensor configured to measure the distance to the plurality of points using laser light reflected from one or more objects 104 in the region 102 that is scanned. For example, the 3D scanner 110 may comprise an Intel RealSense® 3D camera that combines a 2D camera, a second infrared camera and an infrared laser projector. The 2D camera is configured to capture a 2D image of the scanned region 102, while the infrared laser projector and the second infrared camera work cooperatively as the distance sensor to collect distance information within the scanned region 102. Intel RealSense® and Intel® are registered trademarks of Intel Corporation, Santa Clara, Calif., USA.

The vehicle monitoring system 100 illustrated in FIG. 1 further comprises an electronic display 120. The electronic display 120 is configured to display a portion of the region 102 using the 3D model. Further, the electronic display 120 is configured to visually highlight an object 104' within the displayed portion that is located less than a threshold distance from the vehicle (or equivalently, from the vehicle monitoring system 100). The visual highlighting is configured to enhance user perception of the object 104' that is closer to the vehicle than the threshold distance, according to various embodiments. Enhanced perception of the visually highlighted object 104' may facilitate avoiding a collision between the object 104' and the vehicle, for example. In FIGS. 2A and 2B, the threshold distance, labeled $d_T$, is illustrated as a distance from the vehicle monitoring system 100 to a plane 106, illustrated as a dashed-line boundary that intersects with (e.g., bisects) the object 104', within the monitored region 102.

Figure 3A:
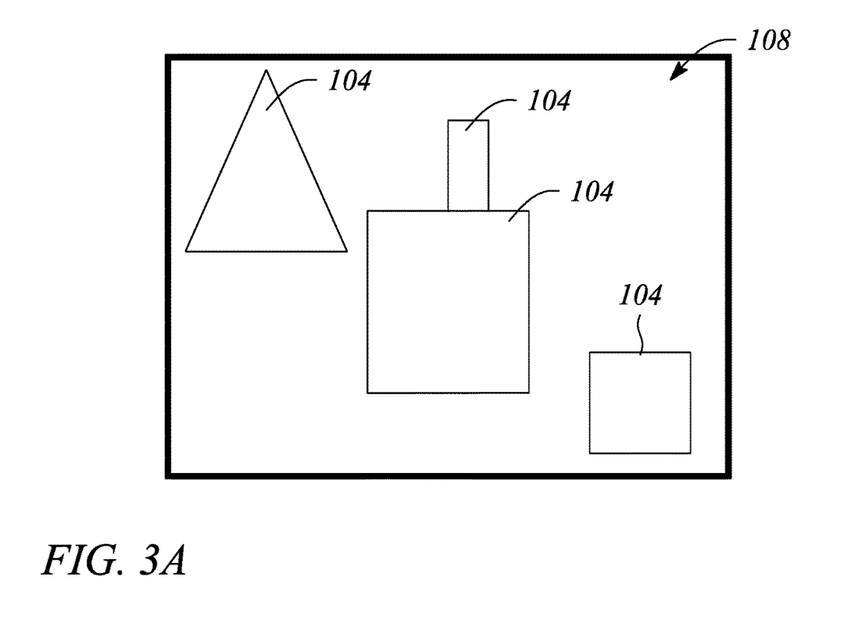
FIG. 3A illustrates a displayed portion of a region that is scanned in an example, according to an embodiment consistent with the principles described herein.

FIG. 3A illustrates a displayed portion 108 of the region 102 in an example, according to an embodiment consistent with the principles described herein. In particular, FIG. 3A illustrates the various objects 104 in the region 102 that is scanned as the objects 104 might appear on a display screen of the electronic display 120. For example, the electronic display 120 may be a two-dimensional (2D) electronic display 120 (e.g., an LCD display) and the displayed portion 108 of the scanned region 102 may be displayed or rendered as a 2D image on the 2D electronic display. Further, as illustrated in FIG. 3A, none of the objects 104 are visually highlighted.

According to some embodiments, the object 104' that is closer than the threshold distance may be visually highlighted on or by the electronic display 120 using a mask applied to the object 104'. For example, a mask comprising cross-hatching or color-shading may be applied to the object 104' or a portion thereof that is being highlighted. Further, the mask may comprise a color (e.g., yellow, red, etc.) configured to draw attention the masked object 104', for example. In some examples, the mask may be applied to any portion (e.g., any pixel) of the scanned region 102 that is determined to be at a distance from the vehicle that is less than the threshold distance.

Figure 3B:
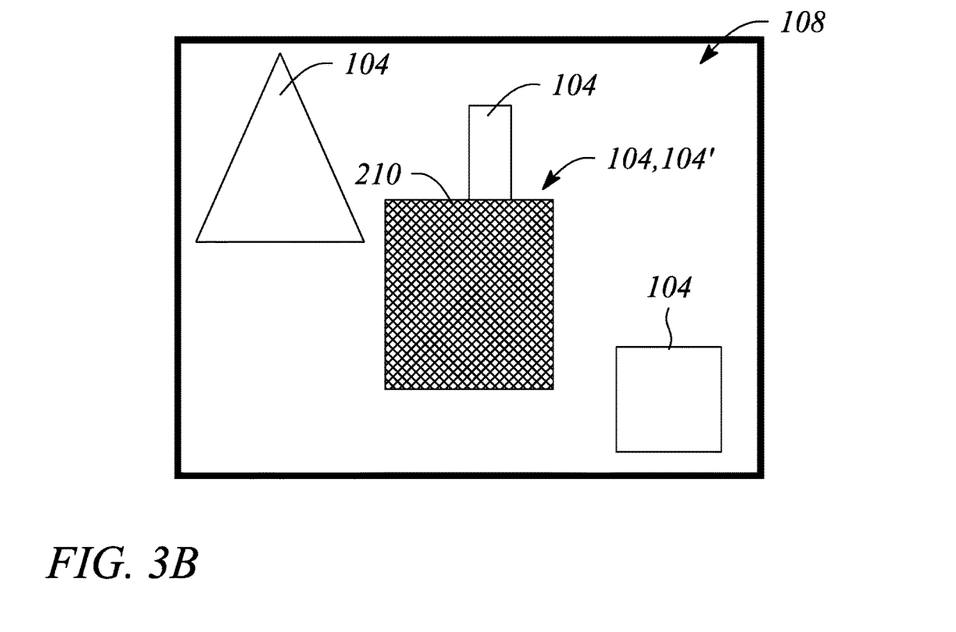
FIG. 3B illustrates a visually highlighted object in the displayed portion 108 of FIG. 3A in an example, according to an embodiment consistent with the principles described herein.

FIG. 3B illustrates a visually highlighted object 104' in the displayed portion 108 of FIG. 3A in an example, according to an embodiment consistent with the principles described herein. In particular, FIG. 3B illustrates the displayed portion of the scanned region 102 that includes the object 104' visually highlighted using a mask 210. As illustrated in FIG. 3B, the mask 210 comprises cross-hatching that is overlaid on or over the object 104' that is closer than the threshold distance. The entire object 104' is substantially covered by the cross-hatching mask 210 in this example. In other examples (not illustrated), only the portion of the object 104' that is actually closer than the threshold distance is covered by the mask 210 to provide visual highlighting, while a remainder of the object 104' may be substantially without the mask 210 (i.e., uncovered by the mask 210).

In another example, the visual highlighting displayed on the electronic display 120 comprises an outline surrounding a border or periphery of the object that is closer than the threshold distance. The outline may comprise a color to draw specific attention to the object such as, but not limited to, yellow, orange or red, for example. Further, in some examples, the outline may be provided around any portion or portions of the region 102 determined to be at less than the threshold distance from the vehicle. In some examples, the outline may be used in conjunction with the mask (e.g., the masked object also may be outlined).

In yet other examples, an alert icon may be displayed on the electronic display 120 to highlight the object determined to be at a distance from the vehicle that is less than the threshold distance. For example, the alert icon may be displayed as superimposed over the object or equivalently, the portion of the scanned region 102 that is within the threshold distance. The alert icon may be rendered in an attention-drawing color and may include, but is not limited to, a triangle, a circle, or a square, for example. The triangle, circle or square may circumscribe an exclamation point or another alphanumeric character, in some examples, to further draw attention to the alert icon. In some embodiments, the alert icon may be used in conjunction with one or both of the mask and the outline (e.g., the alert icon may be located within the mask or the outline).

Figure 3C:
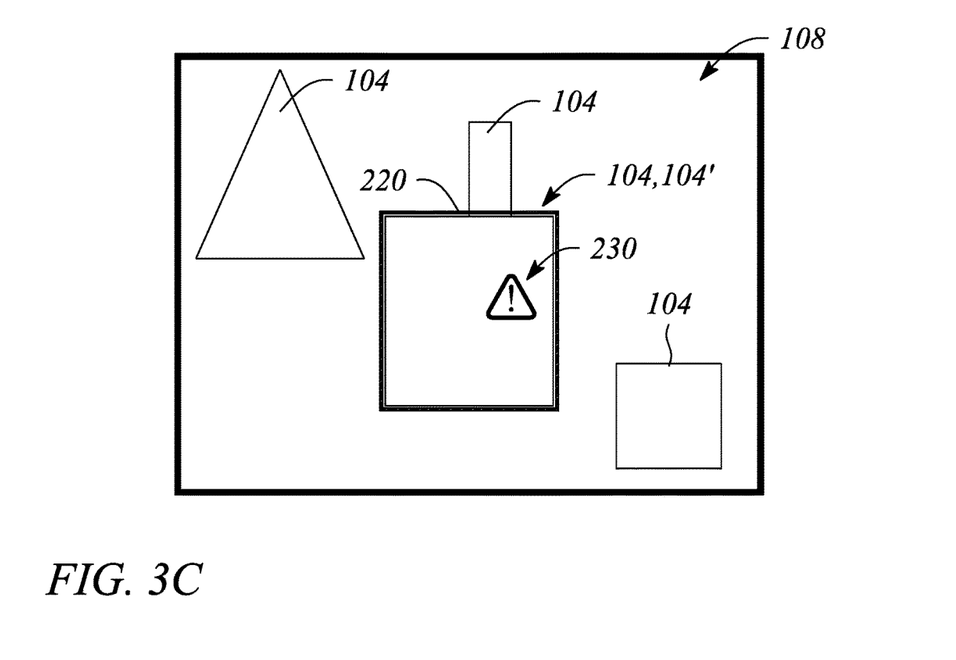
FIG. 3C illustrates a visually highlighted object in the displayed portion of FIG. 3A in an example, according to another embodiment consistent with the principles described herein.

FIG. 3C illustrates a visually highlighted object 104' in the displayed portion 108 of FIG. 3A in an example, according to another embodiment consistent with the principles described herein. In particular, FIG. 3C illustrates the displayed portion of the scanned region 102 including the object 104' visually highlighted using an outline 220. Further illustrated in FIG. 3C is an alert icon 230. While the alert icon 230 may be generally located anywhere in the displayed portion, in FIG. 3C the alert icon 230 is located within the outline 220 and superimposed over the object 104', by way of example.

Referring again to FIG. 1, the electronic display 120 of the vehicle monitoring system 100 may comprise a 3D electronic display 120, according to some embodiments. In some of these embodiments, the threshold distance may correspond to a zero disparity plane associated with the portion of the region 102 that is displayed on the 3D electronic display 120. Further, the visually highlighted object 104' may be an object perceived as being in front of the zero disparity plane of the 3D electronic display 120, according to some embodiments. In particular, when displayed or rendered, the object 104' located at a distance less than the threshold distance is rendered on the 3D electronic display 120 in front of the zero disparity plane. As such, the object is perceived (e.g., by a viewer) as protruding or projecting from or being in front of a physical display surface of the 3D electronic display 120 to visually highlight the object 104', according to various embodiments.

Figure 4:
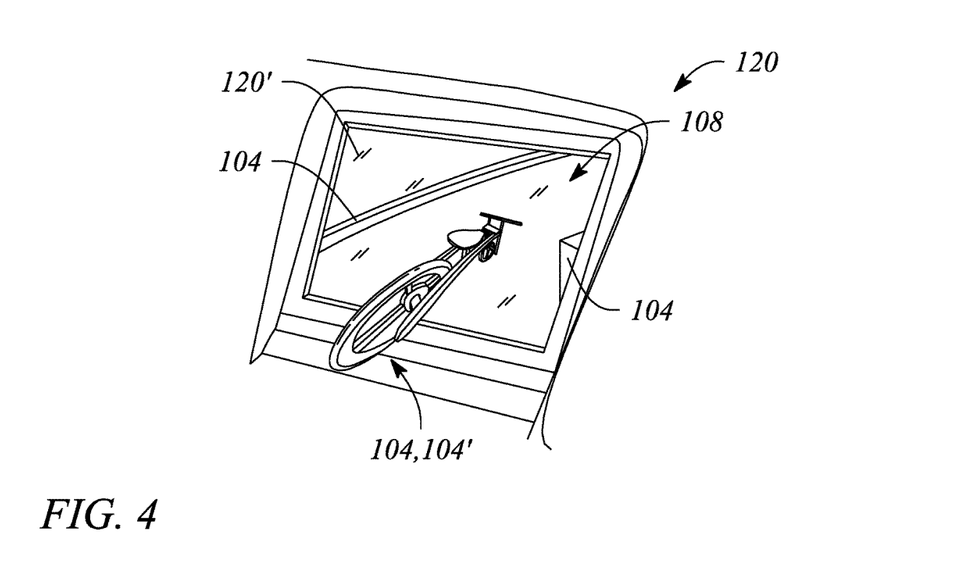
FIG. 4 illustrates a perspective view of a 3D electronic display depicting a visually highlighted object in an example, according to another embodiment consistent with the principles described herein.

FIG. 4 illustrates a perspective view of a 3D electronic display 120 depicting a visually highlighted object 104' in an example, according to another embodiment consistent with the principles described herein. In particular, FIG. 4 illustrates a displayed portion 108 of the scanned region 102 including the object 104' visually highlighted by being rendered in front of the zero disparity plane. The object 104' (e.g., a child's toy bicycle) appears on the 3D electronic display as projecting out of or being in front of a physical surface 120' of the 3D electronic display. Other objects 104 that are at a distance that is greater than the threshold distance appear behind the physical surface 120' of the 3D electronic display, as illustrated in FIG. 4.

In some embodiments, a projective transformation may be applied to the 3D model prior to the displayed portion being rendered on the 3D electronic display 120. In particular, the vehicle monitoring system 100 may further comprise an image processor, for example as described below with respect to FIG. 6. The image processor may be part of the 3D electronic display 120, for example. In other examples, the image processor is part of the 3D scanner 110 or may be another (e.g., separate) element of the vehicle monitoring system 100.

The image processor may be configured to apply the projective transformation to the 3D model prior to the displayed portion being rendered on the 3D electronic display 120. According to various embodiments, the projective transformation is configured to enhance a relative size of the visually highlighted object 104' in comparison to other objects 104 in the image at a distance greater than the threshold distance corresponding to the zero disparity plane. As a result, not only will the visually highlighted object 104' appear in front of the physical display surface 120' of the 3D electronic display 120, the visually highlighted object 104' will be spatially distorted or increased in size as rendered on the 3D electronic display 120. The effect is as if the visually highlighted object 104' is magnified, enlarged or visually inflated or expanded relative to the other objects displayed by the 3D electronic display 120. For example, the object 104' illustrated in FIG. 4 is spatially distorted by application of the projective transformation. As such, perception of the visually highlighted object 104' is further enhanced by the size-distorted rendering resulting from application of the projective transformation, according to various embodiments.

Figure 5A:
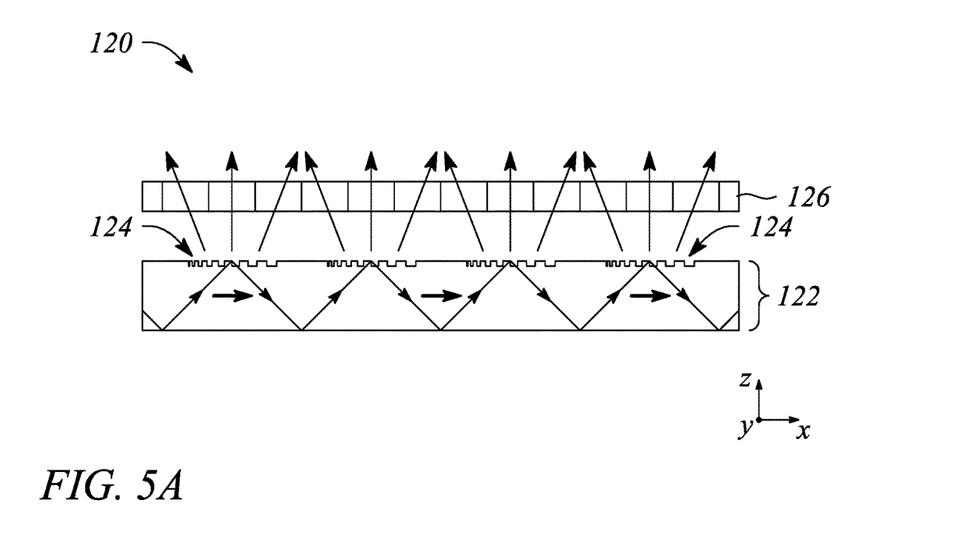
FIG. 5A illustrates a cross sectional view of a three-dimensional (3D) electronic display having a multibeam grating-based backlight in an example, according to an embodiment consistent with the principles described herein.
Figure 5B:
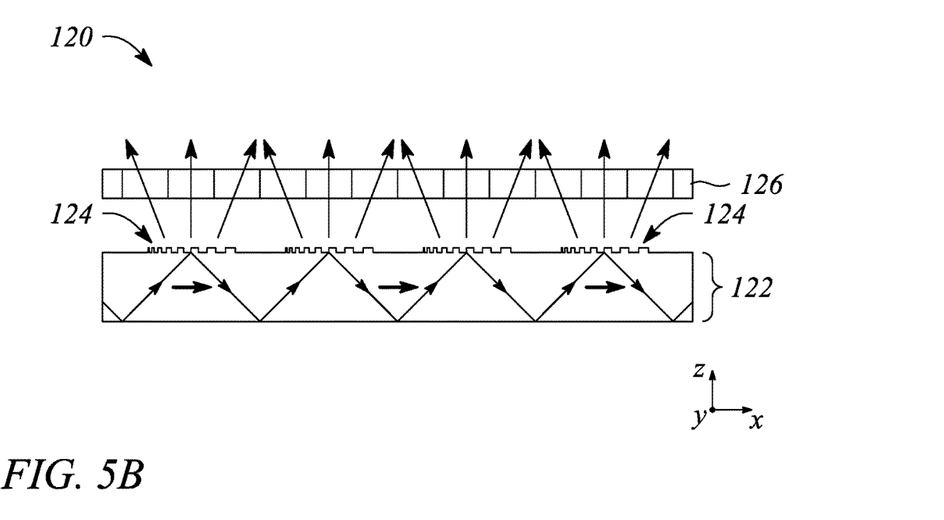
FIG. 5B illustrates a cross sectional view of a three-dimensional (3D) electronic display having a multibeam grating-based backlight in an example, according to another embodiment consistent with the principles described herein.
Figure 5C:
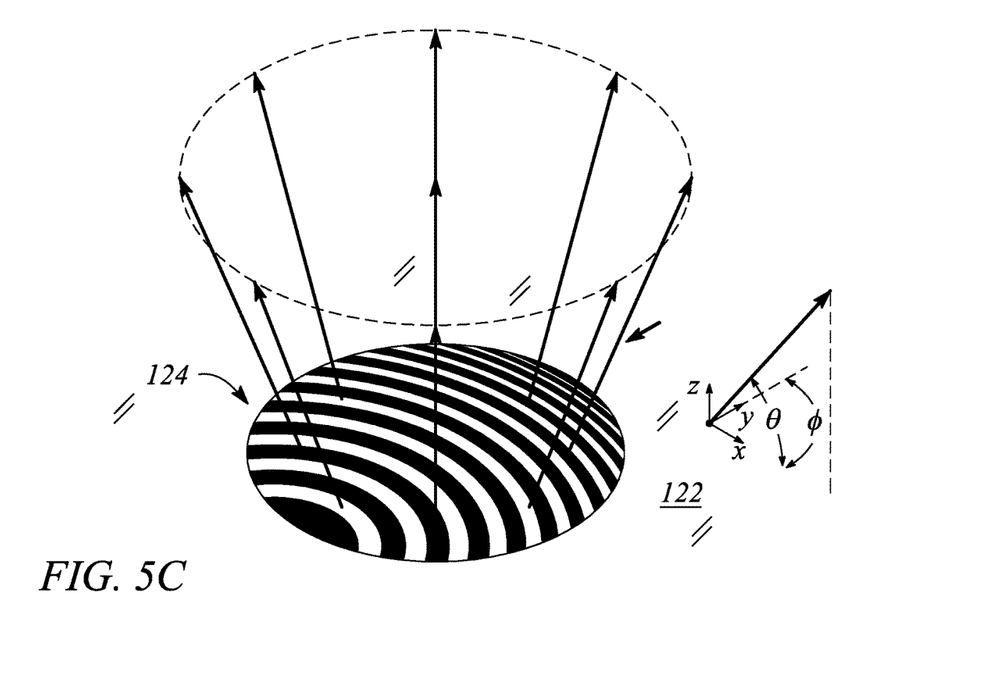
FIG. 5C illustrates a perspective view of a portion of a 3D electronic display having a multibeam grating-based backlight in an example, according to an embodiment consistent with the principles described herein.

According to various embodiments, the 3D electronic display 120 may be substantially any 3D electronic display. In particular, in some embodiments, the 3D electronic display 120 is a multibeam grating-based 3D electronic display 120 comprising a multibeam grating-based backlight and a light modulation layer. FIG. 5A illustrates a cross sectional view of the 3D electronic display 120 having a multibeam grating-based backlight in an example, according to an embodiment consistent with the principles described herein. FIG. 5B illustrates a cross sectional view of the 3D electronic display 120 having a multibeam grating-based backlight in an example, according to another embodiment consistent with the principles described herein. FIG. 5C illustrates a perspective view of a portion of the 3D electronic display 120 having a multibeam grating-based backlight in an example, according to an embodiment consistent with the principles described herein. The 3D electronic display 120 portion illustrated in FIG. 5C may represent the 3D electronic display 120 illustrated in either of FIG. 5A or FIG. 5B, for example. According to various embodiments, the 3D electronic display 120 having the multibeam grating-based backlight may provide enhanced perception of the visually highlighted object as described above.

According to various embodiments, the 3D electronic display 120 illustrated in FIGS. 5A-5C is configured to produce modulated, 'directional' light, i.e., light comprising light beams having different principal angular directions. For example, as illustrated in FIGS. 5A-5C, the 3D electronic display 120 may provide or generate a plurality of light beams illustrated as arrows directed out and away from the 3D electronic display 120 in different predetermined principal angular directions (e.g., as a light field). In turn, the light beams of the plurality may be modulated to facilitate the display of information having 3D content including, but not limited to, the visually highlighted object. In some embodiments, the modulated light beams having different predetermined principal angular directions form a plurality of pixels of the 3D electronic display 120. Further, the 3D electronic display 120 is a so-called 'glasses free' 3D electronic display (e.g., a multiview, 'holographic' or autostereoscopic display) in which the light beams correspond to pixels associated with different 'views' of the 3D electronic display 120.

As illustrated in FIGS. 5A, 5B and 5C, the multibeam grating-based backlight of the 3D electronic display 120 comprises a light guide 122. In particular, the light guide 122 may be a plate light guide 122, according to some embodiments. The plate light guide 122 is configured to guide light from a light source (not illustrated in FIGS. 5A-5C) as guided light (illustrated as an extended arrow propagating in the light guide 122, as further described below). For example, the plate light guide 122 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light according to one or more guided modes of the plate light guide 122, for example.

In various embodiments, the light from the light source is guided as a beam of light along a length of the plate light guide 122. Further, the plate light guide 122 may be configured to guide the light (i.e., the guided light beam) at a non-zero propagation angle. The guided light beam may be guided at the non-zero propagation angle within the plate light guide 122 using total internal reflection, for example. In particular, the guided light beam propagates by reflecting or 'bouncing' between the top surface and the bottom surface of the plate light guide 122 at the non-zero propagation angle (e.g., illustrated by the extended, angled arrow representing a light ray of the guided light beam).

As defined herein, the 'non-zero propagation angle' is an angle relative to a surface (e.g., a top surface or a bottom surface) of the plate light guide 122. In some examples, the non-zero propagation angle of the guided light beam may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees.

In some examples, the light from a light source is introduced or coupled into the plate light guide 122 at the non-zero propagation angle (e.g., about 30-35 degrees). One or more of a lens, a mirror or similar reflector (e.g., a tilted collimating reflector), and a prism (not illustrated) may facilitate coupling light into an input end the plate light guide 122 as the beam of light at the non-zero propagation angle, for example. Once coupled into the plate light guide 122, the guided light beam propagates along the plate light guide 122 in a direction that is generally away from the input end (e.g., illustrated by bold arrows pointing along an x-axis in FIGS. 5A-5B).

Further, the guided light beam produced by coupling light into the plate light guide 122 may be a collimated light beam, according to some examples. In particular, by 'collimated light beam' it is meant that rays of light within the guided light beam are substantially parallel to one another within the guided light beam. Rays of light that diverge or are scattered from the collimated light beam of the guided light beam are not considered to be part of the collimated light beam, by definition herein. Collimation of the light to produce the collimated guided light beam may be provided by the lens or mirror (e.g., tilted collimating reflector, etc.) used to couple the light into the plate light guide 122, for example.

In some examples, the plate light guide 122 may be a slab or plate optical waveguide comprising an extended, substantially planar sheet of optically transparent, dielectric material. The substantially planar sheet of dielectric material is configured to guide the guided light beam using total internal reflection. According to various examples, the optically transparent material of the plate light guide 122 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the plate light guide 122 may further include a cladding layer on at least a portion of a surface (e.g., one or both of the top surface and the bottom surface) of the plate light guide 122 (not illustrated). The cladding layer may be used to further facilitate total internal reflection, according to some examples.

In FIGS. 5A, 5B and 5C, the multibeam grating-based backlight of the illustrated 3D electronic display 120 further comprises an array of multibeam diffraction gratings 124. As illustrated in FIGS. 5A-5B, the multibeam diffraction gratings 124 are located at a surface of the plate light guide 122 (e.g., a top or front surface). In other examples (not illustrated), one or more of the multibeam diffraction gratings 124 may be located within the plate light guide 122. In yet other examples (not illustrated), one or more of the multibeam diffraction gratings 124 may be located at or on a bottom or back surface of the plate light guide 122 (i.e., an opposite surface to the surface illustrated with the multibeam diffraction gratings 124). In combination, the plate light guide 122 and the array of multibeam diffraction gratings 124 provide or serve as the multibeam grating-based backlight of the 3D electronic display 120.

According to various embodiments, a multibeam diffraction grating 124 of the array is configured to scatter or diffractively couple out a portion of the guided light beam as a plurality of light beams having different principal angular directions corresponding to different views of the 3D electronic display 120. For example, the portion of the guided light beam may be diffractively coupled out by the multibeam diffraction grating 124 through the plate light guide surface (e.g., through the top surface of the plate light guide 122). Further, the multibeam diffraction grating 124 is configured to diffractively couple out the portion of the guided light beam as coupled-out light beams and to diffractively redirected the coupled-out light beams away from the plate light guide surface as the plurality of light beams. As discussed above, each of the light beams of the plurality has a different predetermined principal angular direction determined by characteristics of diffractive features of the multibeam diffraction grating 124

According to various embodiments, the multibeam diffraction gratings 124 of the array include a plurality of diffractive features that provide diffraction. The provided diffraction is responsible for the diffractive coupling of the portion of the guided light beam out of the plate light guide 122. For example, the multibeam diffraction grating 124 may include one or both of grooves in a surface of the plate light guide 122 and ridges protruding from the plate light guide surface that serve as the diffractive features. The grooves and ridges may be arranged parallel to one another and, at least at some point along the diffractive features, the grooves and ridges are perpendicular to a propagation direction of the guided light beam that is to be coupled out by the multibeam diffraction grating 124.

In some examples, the grooves or ridges may be etched, milled or molded into the plate light guide surface. As such, a material of the multibeam diffraction gratings 124 may include the material of the plate light guide 122. As illustrated in FIG. 5A, for example, the multibeam diffraction gratings 124 include substantially parallel grooves that penetrate the surface of the plate light guide 122. In FIG. 5B, the multibeam diffraction gratings 124 include substantially parallel ridges that protrude from the surface of the plate light guide 122. In other examples (not illustrated), the multibeam diffraction gratings 124 may be a film or layer applied or affixed to the plate light guide surface.

According to some embodiments, the multibeam diffraction grating 124 may be or comprise a chirped diffraction grating. By definition, the 'chirped' diffraction grating is a diffraction grating exhibiting or having a diffraction spacing of the diffractive features (i.e., a diffraction pitch) that varies across an extent or length of the chirped diffraction grating, e.g., as illustrated in FIGS. 5A-5C. Herein, the varying diffraction spacing is defined and referred to as a 'chirp'. As a result of the chirp, the portion of the guided light beam that is diffractively coupled out of the plate light guide 122 exits or is emitted from the chirped diffraction grating as the coupled-out light beams at different diffraction angles corresponding to different points of origin across the chirped diffraction grating of the multibeam diffraction grating 124. By virtue of a predefined chirp, the chirped diffraction grating is responsible for the predetermined and different principal angular directions of the coupled-out light beams of the light beam plurality.

In some examples, the chirped diffraction grating of the multibeam diffraction grating 124 may have or exhibit a chirp of the diffractive spacing that varies linearly with distance. As such, the chirped diffraction grating is a 'linearly chirped' diffraction grating, by definition. FIGS. 5A-5C illustrate the multibeam diffraction grating 124 as a linearly chirped diffraction grating, for example. In particular, as illustrated, the diffractive features are closer together at a second end of the multibeam diffraction grating 124 than at a first end. Further, the diffractive spacing of the illustrated diffractive features varies linearly from the first end to the second end, as illustrated by way of example and not limitation.

In another example (not illustrated), the chirped diffraction grating of the multibeam diffraction grating 124 may exhibit a non-linear chirp of the diffractive spacing. Various non-linear chirps that may be used to realize the multibeam diffraction grating 124 include, but are not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed.

According to some embodiments, the multibeam diffraction grating 124 may comprise diffractive features that are one or both of curved and chirped. FIG. 5C illustrates a perspective view of a multibeam diffraction grating 124 in, at or on a surface of the plate light guide 122 that are both curved and chirped (i.e., the multibeam diffraction grating 124 is a curved, chirped diffraction grating). In FIG. 5C, the guided light beam has an incident direction relative to the multibeam diffraction grating 124 illustrated as a bold arrow at a first end of the multibeam diffraction grating 124. Also illustrated is the plurality of coupled-out or emitted light beams illustrated by arrows pointing away from the multibeam diffraction grating 124 at the surface of the plate light guide 122. As illustrated, the light beams are emitted in a plurality of predetermined different principal angular directions. In particular, the predetermined different principal angular directions of the emitted light beams are different from one another in both azimuth and elevation, as illustrated. According to various examples, both the predefined chirp of the diffractive features and the curve of the diffractive features may be responsible for the predetermined different principal angular directions of the emitted light beams.

In particular, at different points along the curve of the diffractive features, an 'underlying diffraction grating' of the multibeam diffraction grating 124 associated with the curved diffractive features has different azimuthal orientation angles $\phi_f$. By 'underlying diffraction grating', it is meant a diffraction grating of a plurality of non-curved diffraction gratings that, in superposition, yield the curved diffractive features of the multibeam diffraction grating 124. At a given point along the curved diffractive features, the curve has a particular azimuthal orientation angle $\phi_f$ that generally differs from the azimuthal orientation angle $\phi_f$ another point along the curved diffractive features. Further, the particular azimuthal orientation angle $\phi_f$ results in a corresponding azimuthal component $\phi$ of a principal angular direction $\{\theta, \phi\}$ of a light beam emitted from the given point. In some examples, the curve of the diffractive features (e.g., grooves, ridges, etc.) may represent a section of a circle. The circle may be coplanar with the light guide surface. In other examples, the curve may represent a section of an ellipse or another curved shape, e.g., that is coplanar with the light guide surface.

Referring again to FIGS. 5A-5B, the modulation layer of the 3D electronic display 120 comprises a light valve array 126. According to various embodiments, the light valve array 126 is configured to modulate the differently directed light beams (i.e., the plurality of light beams having different predetermined principal angular directions) corresponding to the different views of the 3D electronic display 120. In particular, the light beams of the light beam plurality pass through and are modulated by individual light valves of the light valve array 126. The modulated, differently direct light beams may represent pixels of the 3D electronic display 120, according to various embodiments. In various examples, different types of light valves may be employed in the light valve array 126 including, but not limited to, one or more of liquid crystal light valves, electrophoretic light valves, and light valves based on electrowetting.

Figure 6:
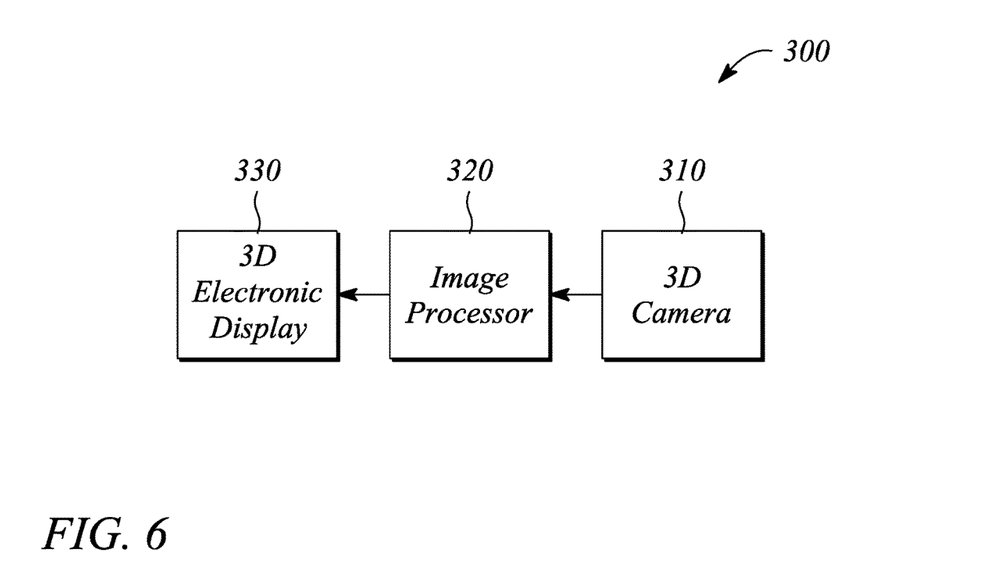
FIG. 6 illustrates a block diagram of a three-dimensional (3D) vehicle monitoring system in an example, according to an embodiment of the principles described herein.

According to some examples of the principles described herein, a three-dimensional (3D) vehicle monitoring system is provided. FIG. 6 illustrates a block diagram of a three-dimensional (3D) vehicle monitoring system 300 in an example, according to an embodiment of the principles described herein. In particular, the 3D vehicle monitoring system 300 may be configured to provide collision avoidance when a vehicle is being moved in a monitored direction. For example, the 3D vehicle monitoring system 300 may be configured to monitor a region behind the vehicle and thus provide backup assistance to an operator of the vehicle.

As illustrated in FIG. 6, the 3D vehicle monitoring system 300 comprises a 3D camera 310. In some embodiments, the 3D camera 310 is a rearward-facing 3D camera 310. The 3D camera 310 is configured to capture a 3D image of a region adjacent to the vehicle (e.g., behind the vehicle). According to various embodiments, the 3D camera 310 may be substantially similar to the 3D scanner 110 described above with respect to the vehicle monitoring system 100. In particular, the 3D camera 310 may comprise one or more of a plurality of cameras offset from one another, a time-of-flight camera, and a composite of a laser-based distance sensor and a two-dimensional (2D) camera configured to monitor the region adjacent to the vehicle.

The 3D vehicle monitoring system 300 illustrated in FIG. 6 further comprises an image processor 320. The image processor 320 is configured to provide a 3D model of the 3D imaged region using the 3D image captured by the 3D camera 310. According to various embodiments, the 3D model includes a spatial configuration of objects within the 3D imaged region. The 3D imaged region and the objects within the 3D imaged region may be substantially similar to the region 102 and the objects 104, 104' described above with respect to the vehicle monitoring system 100.

According to various embodiments, the 3D vehicle monitoring system 300 further comprises a 3D electronic display 330. The 3D electronic display 330 is configured to display a portion of the 3D imaged region using the 3D model. According to some embodiments, any object within the displayed portion located at a distance from the vehicle (e.g., distance from the rear of the vehicle) that is less than a threshold distance may be visually highlighted on the 3D electronic display 330. In particular, the 3D electronic display 330 is further configured to visually highlight the object within the displayed portion that is located less than the threshold distance from the vehicle, according to some embodiments.

In some embodiments, the 3D electronic display 330 is substantially similar to the 3D electronic display 120 of the vehicle monitoring system 100, described above. For example, the threshold distance may correspond to a zero disparity plane associated with the portion of the 3D imaged region that is displayed by the 3D electronic display 330. The visually highlighted object may be perceived as being in front of the zero parity disparity plane (i.e., in front of a physical surface of the 3D electronic display 330), in some embodiments. In addition, in some embodiments, the image processor 320 is further configured to apply a projective transformation to the 3D model prior to the displayed portion being rendered on the 3D electronic display 330. The applied projective transformation may be configured to enhance a relative size of the visually highlighted object in comparison to other objects in the displayed portion located at a distance that is greater than the threshold distance corresponding to the zero disparity plane.

In some embodiments, the 3D electronic display 330 may comprise a multibeam grating-based 3D electronic display. For example, in some embodiments, the 3D electronic display 330 may be substantially similar to the 3D electronic display 120 having a multibeam grating-based backlight and a modulation layer described above with respect to the vehicle monitoring system 100. In particular, the 3D electronic display 330 may comprise multibeam grating-based backlight and a modulation layer. The multibeam grating-based backlight may comprise a light guide to guide a beam of light (e.g., a collimated light beam), and an array of multibeam diffraction gratings configured to diffractively couple out portions of the guided light beam as a plurality of differently directed light beams directed away from the light guide. The light guide and the multibeam diffraction gratings may be substantially similar to the plate light guide 122 and the multibeam diffraction gratings 124 described above for the vehicle monitoring system 100. In addition, the modulation layer may comprise a light valve array to modulate the differently directed light beams. The modulated, differently directed light beams form a plurality of different views of the 3D electronic display 330, according to various embodiments. The light valve array may be substantially similar to the light valve array 126 described above with respect to the vehicle monitoring system 100. In particular, the modulated, differently directed light beams have different predetermined principal angular directions that form a plurality of pixels associated with different 'views' of the 3D electronic display 330.

According to some embodiments (not illustrated), the 3D electronic display 330 may further include a light source. The light source is configured to provide light that propagates in the light guide as the guided light beam. In particular, the guided light is light from the light source that is coupled into the edge (or input end) of the light guide, according to some embodiments. For example, a lens, a collimating reflector or similar device (not illustrated) may facilitate coupling of light into the light guide at the input end or edge thereof. In various examples, the light source may comprise substantially any source of light including, but not limited to, a light emitting diode (LED). In some examples, the light source may comprise an optical emitter configured produce a substantially monochromatic light having a narrowband spectrum denoted by a particular color.

In particular, the color of the monochromatic light may be a primary color of a particular color space or color model (e.g., a red-green-blue (RGB) color model).

According to some examples of the principles described herein, a method of vehicle monitoring is provided. The method of vehicle monitoring may be used to monitor an area or region adjacent to a vehicle. The area or region may include, but is not limited to, a region in front of, to a side of and behind or to the rear of the vehicle, for example.

Figure 7:
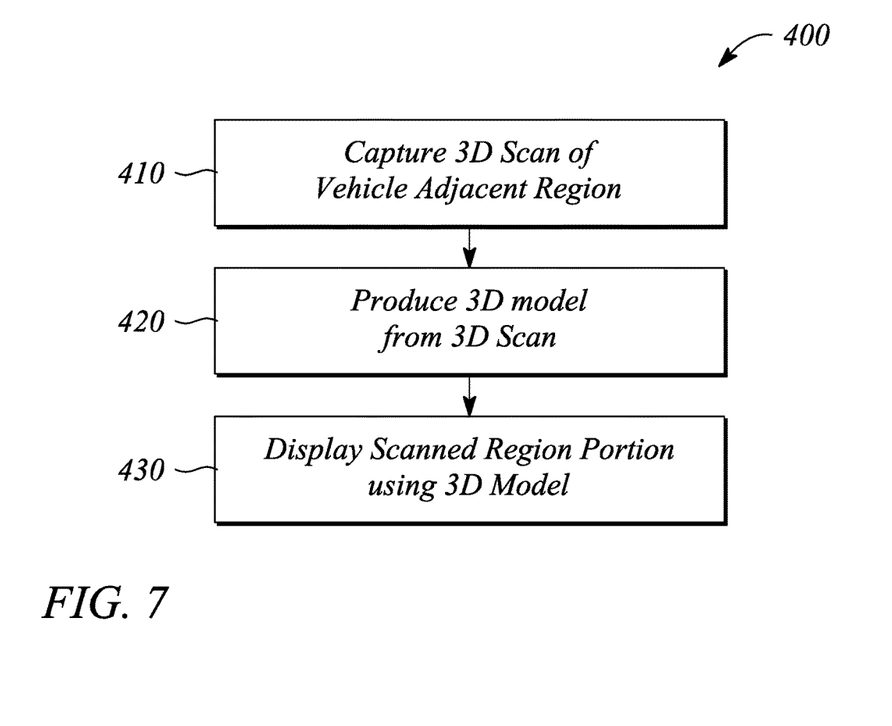
FIG. 7 illustrates a flow chart of a method of vehicle monitoring in an example, according to an embodiment consistent with the principles described herein.

FIG. 7 illustrates a flow chart of a method 400 of vehicle monitoring in an example, according to an embodiment consistent with the principles described herein. As illustrated in FIG. 7, the method 400 of vehicle monitoring comprises capturing 410 a 3D scan of a region adjacent to a vehicle using a 3D scanner. According to various embodiments, the 3D scanner used in capturing 410 may be substantially similar to the 3D scanner 110 described above with respect to the vehicle monitoring system 100. For example, the 3D scanner may comprise one or more of a plurality of cameras offset from one another (e.g., a binocular pair of cameras), a time-of-flight camera, and a composite of a laser-based distance sensor and a two-dimensional (2D) camera. In some examples, the 3D scanner may be substantially similar to the 3D camera 310 described above with respect to the 3D vehicle monitoring system 300.

The method 400 of vehicle monitoring illustrated in FIG. 7 further comprises producing a 3D model from the captured 3D scan. According to various embodiments, the 3D model includes a spatial configuration of objects located within the scanned region. The 3D model may be produced from the 3D scan using one or both of a point cloud and an object mesh produced by the 3D scanner, for example.

According to various embodiments, the method 400 of vehicle monitoring further comprises displaying 430 a portion of the scanned region using the 3D model. According to various embodiments, displaying 430 a portion of the scanned region comprises visual highlighting an object within the displayed portion that is at a distance from the vehicle less than a threshold distance. In some embodiments, displaying 430 a portion of the scanned region may employ an electronic display substantially similar to the electronic display 120 of the vehicle monitoring system 100, described above. Further, visually highlighting the object may be substantially similar to any form of visually highlighting described above. For example, the object may be visually highlighted using one or more of a mask, an outline and an alert icon. In another example, displaying 430 a portion of the scanned region comprises using a 3D electronic display, for example, as described above with respect to the 3D electronic display 330 of the 3D vehicle monitoring system 300. With a 3D electronic display, the visually highlighted object appears to be in front of a zero disparity plane of the 3D electronic display corresponding to the threshold distance.

According to some embodiments, displaying 430 a portion of the scanned region using a 3D electronic display (e.g., a 3D electronic display having a multibeam grating-based backlight) may further comprise guiding light in a plate light guide as a light beam at a non-zero propagation angle. Displaying 430 a portion of the scanned region using a 3D electronic display may further comprise diffractively coupling out a portion of the guided light beam using an array of multibeam diffraction gratings on the plate light guide. Diffractively coupling out the guided light beam portion may comprise producing a plurality of coupled-out light beams that are directed away from the plate light guide in a plurality of different principal angular directions corresponding to different views of the 3D electronic display, for example. Further, displaying 430 a portion of the scanned region using a 3D electronic display may further comprise modulating the plurality of coupled-out light beams using a plurality of light valves, the modulated light beams representing pixels of the 3D electronic display.

Further, the method 400 of vehicle monitoring may comprise applying a projective transformation to the 3D model prior to displaying 430 the portion of the scanned region on the 3D display. In some embodiments, the projective transformation may include a depth compression of the displayed portion to enhance a relative size of the highlighted object in comparison to objects in the image at a distance greater than the threshold distance corresponding to the zero disparity plane.

Thus, there have been described examples of a vehicle monitoring system, a 3D vehicle monitoring system and a method of vehicle monitoring that visually highlight an object that is closer to a vehicle than a threshold distance. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A vehicle monitoring system comprising:
   a three-dimensional (3D) scanner configured to scan a region adjacent to a vehicle, the scan being used to provide a 3D model including a spatial configuration of objects located within the scanned region;
   a 3D electronic display configured to display a portion of the scanned region using the 3D model and to visually highlight an object within the displayed portion that is located less than a threshold distance from the vehicle, the threshold distance corresponding to a zero disparity plane associated with the portion of the scanned region displayed by the 3D electronic display; and
   an image processor configured to apply a projective transformation to the 3D model prior to the displayed portion being rendered on the 3D electronic display, the projective transformation being configured to enhance a relative size of the visually highlighted object in comparison to objects in the displayed portion at a distance greater than the threshold distance corresponding to the zero disparity plane and to provide a visual perception of the visually highlighted object as being in front of the zero disparity plane on the 3D electronic display,
   wherein visually highlighting an object is configured to enhance user perception of the object that is closer to the vehicle than the threshold distance.

2. The vehicle monitoring system of claim 1, wherein the 3D scanner comprises a plurality of cameras offset from one another, a distance from the 3D scanner being determined by disparity estimation using separate images captured by different cameras of the plurality.

3. The vehicle monitoring system of claim 1, wherein the 3D scanner comprises a time-of-flight camera.

4. The vehicle monitoring system of claim 1, wherein the 3D scanner comprises:
   a distance sensor configured to measure a distance to a plurality of points within the scanned region from the distance sensor; and
   a camera configured to capture a two-dimensional (2D) image of the scanned region, the measured distance being used to generate one or both of a point cloud and an object mesh to provide the 3D model, the 2D image being used to paint the 3D model.

5. The vehicle monitoring system of claim 4, wherein the distance sensor comprises:
 a laser configured to scan the scanned region; and
 an optical sensor configured to measure the distance to the plurality of points using laser light reflected from objects in the scanned region.

6. The vehicle monitoring system of claim 1, wherein the 3D electronic display is further configured to visually highlight an object that is located less than a threshold distance comprising one or more of applying a mask to the object, applying an outline around the object, and displaying an alert icon indicating the object.

7. The vehicle monitoring system of claim 1, wherein the 3D electronic display comprises:
 a plate light guide configured to guide a light beam at a non-zero propagation angle;
 an array of multibeam diffraction gratings, a multibeam diffraction grating of the array being configured to diffractively couple out a portion of the guided light beam as a plurality of coupled-out light beams having different principal angular directions corresponding to different views of the 3D electronic display; and
 a light valve array configured to modulate the plurality of coupled-out light beams corresponding to the different views of the 3D electronic display, the modulated light beams representing pixels of the 3D electronic display.

8. The vehicle monitoring system of claim 7, wherein the multibeam diffraction grating comprises a linearly chirped diffraction grating, and wherein diffractive features of the multibeam diffraction grating comprise one or both of curved grooves in a surface of the plate light guide and curved ridges on the plate light guide surface.

9. The vehicle monitoring system of claim 1, wherein the 3D scanner is configured to scan a region behind the vehicle, the enhanced user perception being configured to assist in collision avoidance when the vehicle is moving in reverse, the vehicle monitoring system being a rearview, backup assist vehicle monitoring system.

10. A three-dimensional (3D) vehicle monitoring system comprising:
 a 3D camera configured to capture a 3D image of a region adjacent to a vehicle;
 an image processor configured to provide a 3D model of the 3D imaged region using the 3D image, the 3D model including a spatial configuration of objects within the 3D imaged region; and
 a 3D electronic display configured to display a portion of the 3D imaged region using the 3D model and to visually highlight an object within the displayed portion that is located less than a threshold distance from the vehicle,
 wherein the visually highlighted object is configured to provide collision avoidance when the vehicle is being moved in a direction of the adjacent region.

11. The 3D vehicle monitoring system of claim 10, wherein the 3D camera comprises one or more of a plurality of cameras offset from one another, a time-of-flight camera, and a composite of a laser-based distance sensor and a two-dimensional (2D) camera.

12. The 3D vehicle monitoring system of claim 10, wherein the threshold distance corresponds to a zero disparity plane associated with the portion of the 3D imaged region that is configured to be displayed by the 3D electronic display, the visually highlighted object in the display portion being perceived as being in front of the zero disparity plane.

13. The 3D vehicle monitoring system of claim 12, wherein the image processor is further configured to apply a projective transformation to the 3D model prior to the 3D imaged region portion being displayed on the 3D electronic display, the projective transformation being configured to enhance a relative size of the visually highlighted object in comparison to other objects in the displayed portion, the other objects being located at a distance that is greater than the threshold distance corresponding to the zero disparity plane.

14. The 3D vehicle monitoring system of claim 10, wherein the 3D electronic display comprises a multibeam grating-based 3D electronic display.

15. A method of vehicle monitoring, the method comprising:
 capturing a 3D scan of a region adjacent to a vehicle using a 3D scanner;
 producing a 3D model from the captured 3D scan comprising applying a projective transformation to the 3D model, the 3D model including a spatial configuration of objects located within the scanned region; and
 displaying using a 3D electronic display a portion of the scanned region using the 3D model, the projective transformation being applied prior to displaying the scanned region portion on the 3D electronic display,
 wherein displaying a portion of the scanned region comprises visually highlighting an object within the displayed portion at a distance from the vehicle that is less than a threshold distance, the visually highlighted object appearing to be in front of a zero disparity plane of the 3D electronic display corresponding to the threshold distance,
 wherein the visually highlighted object is configured to enhance user perception of the object that is closer to the vehicle than the threshold distance, the projective transformation including a depth compression of the displayed portion to enhance a relative size of the visually highlighted object in comparison to objects in the scanned region at a distance greater than the threshold distance corresponding to the zero disparity plane.

16. The method of vehicle monitoring of claim 15, wherein displaying a portion of the scanned region using the 3D electronic display comprises:
 guiding light in a plate light guide as a light beam at a non-zero propagation angle;
 diffractively coupling out a portion of the guided light beam using an array of multibeam diffraction gratings on the plate light guide, wherein diffractively coupling out the guided light beam portion comprises producing a plurality of coupled-out light beams that are directed away from the plate light guide in a plurality of different principal angular directions corresponding to different views of the 3D electronic display; and
 modulating the plurality of coupled-out light beams using a plurality of light valves, the modulated light beams representing pixels of the 3D electronic display to display the portion as a 3D image.

* * * * *